United States Patent
Fujikawa et al.

(10) Patent No.: US 6,441,775 B1
(45) Date of Patent: Aug. 27, 2002

(54) RADAR DEVICE, SIMILAR DEVICE, AND RECEIVED DATA WRITE METHOD

(75) Inventors: Takumi Fujikawa; Hiroyuki Kobayashi; Motoji Kondo, all of Nishinomiya (JP)

(73) Assignee: Furuno Electric Co. Ltd., Nishinomiya (JP)

(*) Notice: Subject to any disclaimer, the term of this patent is extended or adjusted under 35 U.S.C. 154(b) by 0 days.

(21) Appl. No.: 09/763,228

(22) PCT Filed: Jul. 23, 1999

(86) PCT No.: PCT/JP99/03986
§ 371 (c)(1),
(2), (4) Date: May 2, 2001

(87) PCT Pub. No.: WO00/11492
PCT Pub. Date: Mar. 2, 2000

(30) Foreign Application Priority Data

Aug. 21, 1998 (JP) .......................................... 10-235392

(51) Int. Cl.[7] .............................................. G01S 7/298
(52) U.S. Cl. ........................ 342/185; 342/175; 342/176; 342/195
(58) Field of Search ............................. 342/27, 28, 41, 342/175–186, 195, 159–174; 315/367, 378

(56) References Cited

U.S. PATENT DOCUMENTS

| | | | | | |
|---|---|---|---|---|---|
| 3,792,304 | A | * | 2/1974 | Dalena et al. | 315/367 |
| 3,975,662 | A | * | 8/1976 | Janosky | 315/378 |
| 4,069,481 | A | * | 1/1978 | Easy et al. | 342/185 |
| 6,211,814 | B1 | * | 4/2001 | Benjamin et al. | 342/185 |

* cited by examiner

*Primary Examiner*—Bernarr E. Gregory
(74) *Attorney, Agent, or Firm*—Pillsbury Winthrop LLP

(57) ABSTRACT

While received data is stored into a video memory through coordinate conversion, the level of image data is gradually reduced simultaneously with this, by which the image of a target is discriminately displayed readily from among a clutter even without performing adjustment which would conventionally be involved. The radar apparatus is composed of a video memory 6 for successively converting received data from polar to rectangular coordinates along with sweep rotation and storing the data, a FIRST detector for detecting a FIRST so that data write by the coordinate conversion is effected only at a time of FIRST detection, and a subtraction data generator 9 for subtracting a constant value from pixel data of a area designated by a subtraction area designator 14 on the video memory 6 during a period other than FIRSTs.

10 Claims, 13 Drawing Sheets

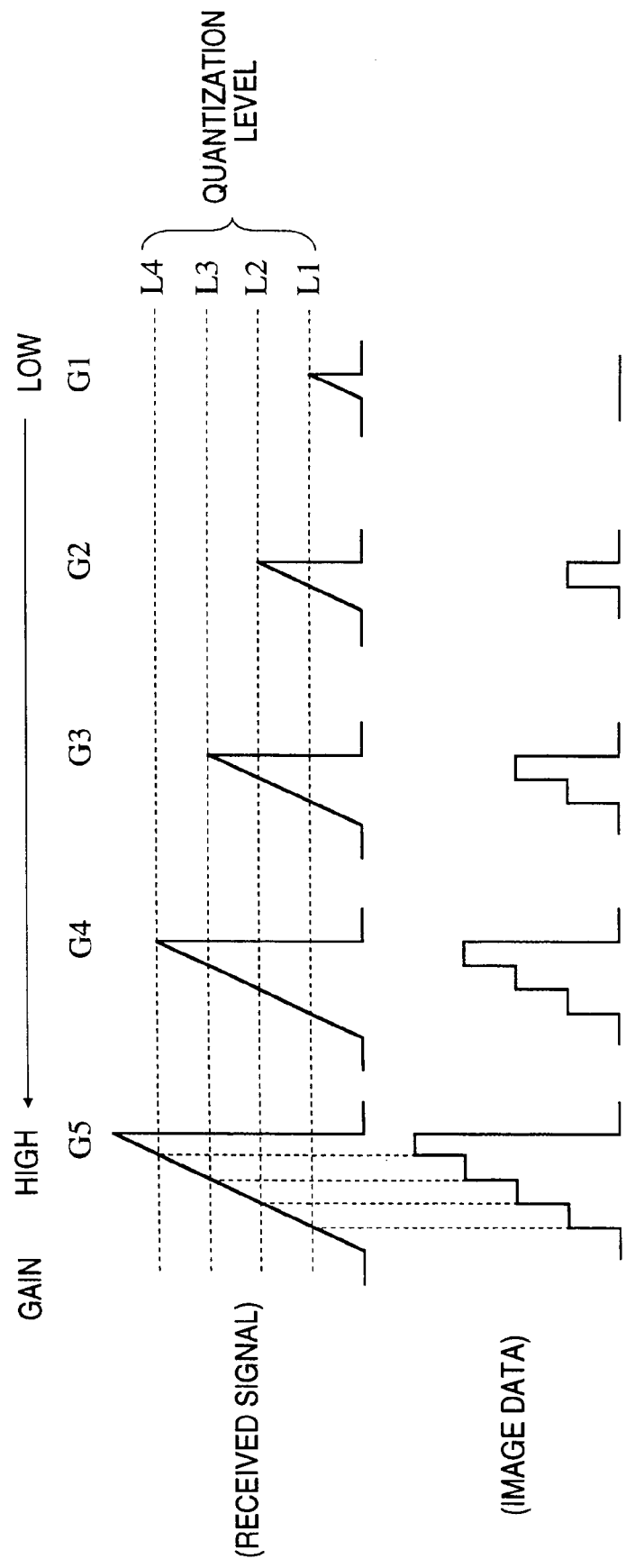

RADAR DEVICE, SIMILAR DEVICE, AND RECEIVED DATA WRITE METHOD

This application is the national phase of international application PCT/JP99/03986 filed Jul. 23, 1999 which designated the U.S, and that international application was not published under PCT Article 21(2) in English.

BACKGROUND OF THE INVENTION

The present invention relates to detection apparatuses such as radar or sonar apparatuses for first storing received detection signals defined in a polar coordinate system and coming from the whole horizontal directions into a video memory having an array of memory elements arranged in a rectangular Cartesian coordinate system and then displaying the stored data on an indicator thereof in accordance with a raster scanning method. More particularly, the invention relates to a radar apparatus or like apparatuses such as sonars and a method for writing received data into a memory, which are capable of displaying a target as an image so that the target echo is distinguishable from clutter.

FIG. 1 shows a block diagram of a conventional radar apparatus.

A radar antenna 1 is rotated in a horizontal plane at one time period and successively radiates pulses of radio waves at another period and receives echoes of radio waves reflected by targets. A receiver circuit 2 detects and amplifies signals received by the radar antenna 1. An A/D converter 3 converts an analog signal outputted by the receiver circuit 2 into a digital signal. A primary memory 4 stores signal data for one sweep resulting from the analog to-digital conversion in real time, and is used as a buffer for writing the one-sweep data into a succeeding-stage video memory 6 by the time when echo signal data resulting from a next transmission are written thereinto.

A coordinate converter 5 generates addresses representative of pixels of the video memory arrayed in Cartesian coordinates successively from the center coordinate as a start address to outward directions based on, for example, both an antenna angle θ with respect to the heading direction of the ship and a read position of the primary memory 4 from which a signal is read out. The coordinate converter 5 is constructed by hardware that performs operations in accordance with the following equations:

$X = X_s + r \sin θ$ $Y = Y_s + r \cos θ$

Where X and Y are addresses representative of a pixel of the video memory;

Xs and Ys are addresses representative of the center of the memory;

r is the distance from the center; and

θ is the angle for coordinate conversion.

The video memory 6 has enough capacity to store echo data for display received during one rotation of the radar antenna 1. A display unit 7 is raster-scanned by a display control unit (not shown). The signals stored in the video memory 6 are read at a high speed in synchronism with the raster scanning so that the received signals are displayed in brightness or different colors depending on the strength thereof.

With the conventional radar apparatus constructed as explained in the foregoing, it has been necessary to appropriately adjust GAIN, STC and FTC controls and the like so that targets are displayed as distinguished from clutter such as sea clutter or rain/snow clutter. In particular, in such cases as the difference between target echoes and clutter in signal strength is small, there will be required a subtle adjustment. Operations are performed for searching and determining an optimal value by comparing an image obtained before an adjustment made and another image obtained after the adjustment performed to control the amount of the adjustment for determining the optimal value.

However, with the foregoing conventional apparatus, there has been such a problem that it takes a long time to complete the adjustment, since images are updated only on the sweep line in line with an antenna pointing direction, and hence the confirmation of an adjustment result will not be done until the rotating sweep line comes up to a straight line extending over the measuring point, and further since the time required for one rotation of the antenna is normally 2 to 3 seconds. Further, if an optimal adjustment value provided to another target is different from the other ones, the adjustment operation is required to be performed for each target. Thus, troublesome adjustment operations should frequently be done to observe displayed images, resulting in a problem that the apparatus is very inconvenient to be used in terms of operability and response. This problem has been found not only in radar apparatuses but also in like apparatuses (e.g., sonars) in which received data defined in a polar coordinate system are successively converted to corresponding ones in a Cartesian coordinate system and stored with rotation of the sweep line. An object of the present invention is to provide a radar and like systems, and a method for writing received date into a memory, which are capable of displaying an image of a target so that the image is readily distinguished from clutter, by reducing the level of image data and simultaneously storing received data into the video memory through coordinate conversion, without any adjustments having been done in prior art apparatuses.

SUMMARY OF THE INVENTION

A radar apparatus according to the present invention comprises a video memory for storing signals obtained by coordinate conversions successively converting received data from a polar coordinate system to a rectangular Cartesian coordinate system along with the sweep rotation, and subtraction means for subtracting a constant value from data supplied from memory elements in an area set on the video memory in parallel with writing data into the video memory with the coordinate conversion.

The subtraction means subtracts the constant value from pixel data of the set region so that images within the set region are seen as being gradually disappeared independently of images displayed with the sweep rotation. Thus, the images in the set region can be observed in the same way as images displayed by an adjustment for gradually reducing the gain during one rotation of sweep which was made in the conventional device. As a result, it will be possible to readily display the image of a target as distinguished from clutter even without performing manual fine adjustments.

Also, the radar apparatus according to the invention, further comprises FIRST detection means for detecting an access as a FIRST access (hereinafter referred to as FIRST) that a pixel of the video memory is accessed for a first time at the coordinate conversion during one sweep rotation. The subtraction means performs subtractions at times other than FIRST detections.

In the coordinate conversion, received data are scattered, geometrically, denser in central portions of the coordinate and sparser in peripheral portions thereof. Thus, the nearer the address of a pixel in the video memory to the center thereof, the more a data amount corresponding to the one pixel of the memory. In this case, data to be written into one pixel of the video memory is selected from among a plurality of received data. When writing-over operations are merely performed in one pixel, the last written data is stored therein. While, when a data having the largest value is selected from among the received data and written thereinto, FIRST detection and MAX process are executed. The FIRST detection is an operation of detecting that an access to a pixel of the video memory is made for the first time during one sweep rotation. The MAX process is an operation that when a FIRST is detected, data received at that time is written into a memory element, and that when a FIRST is not detected (i.e., at a second and following accesses), the current received data and data having been written in the pixel are compared with each other in magnitude to write a data having larger value over the previously written data. Thus, there are methods such as the one in which a new received data is written over a previously stored one into one pixel at a coordinate conversion, or another one in which a data having the largest value is written thereinto both by the FIRST detection and the MAX process as explained above. In either case, since only one piece of data can be written into one pixel in the video memory, only one access is required in order to satisfy the condition that one piece of data is written into one pixel. Accordingly, in the present invention, when a FIRST detection is made, an access to the pixel of the video memory is made to write a received data. When a FIRST is not detected, accesses for coordinate conversion to the video memory are not executed. With such an arrangement, there will be provided a period during which no access for coordinate conversion is made to the video memory during the coordinate conversion period. Therefore, during this period, the subtraction process on pixel data in the region is performed by the subtraction means.

With the present invention, it is also possible that a radar apparatus comprises LAST detection means for detecting, as a LAST access (hereinafter referred to simply as LAST), an access that a pixel of the video memory is accessed for the last time at the coordinate conversion during one round of sweep, wherein the subtraction means performs subtraction operations at times other than the LAS detection.

That is, the coordinate conversion is executed only at the time of a LAST detection instead of the time of the FIRST detection. Therefore, at a coordinate conversion in which a LAST is not detected on one pixel, the operations by the subtraction means will be performed.

Also, in the present invention, the region may be arbitrarily designated by region designating means. With such an arrangement, it becomes possible, for example, to designate a region of interest on the screen by a cursor or the like and display the image of a target as distinguished from clutter within the region.

Since the ratio of the FIRST access period or the LAST access period to the whole period becomes larger with increase of the sweep rotation speed, the period over which the entire region is accessed for subtraction will be eventually shortened so that the gradual image disappearance would no longer be fulfilled sufficiently. In such a case, the size of the area specified is reduced and is freely moved on the screen to achieve the same object.

BRIEF DESCRIPTION OF THE DRAWINGS

FIG. 10 shows a received signal and image data after quantized when the gain is continuously varied;

DETAILED DESCRIPTION OF THE PREFERRED EMBODIMENTS

Figure 1:
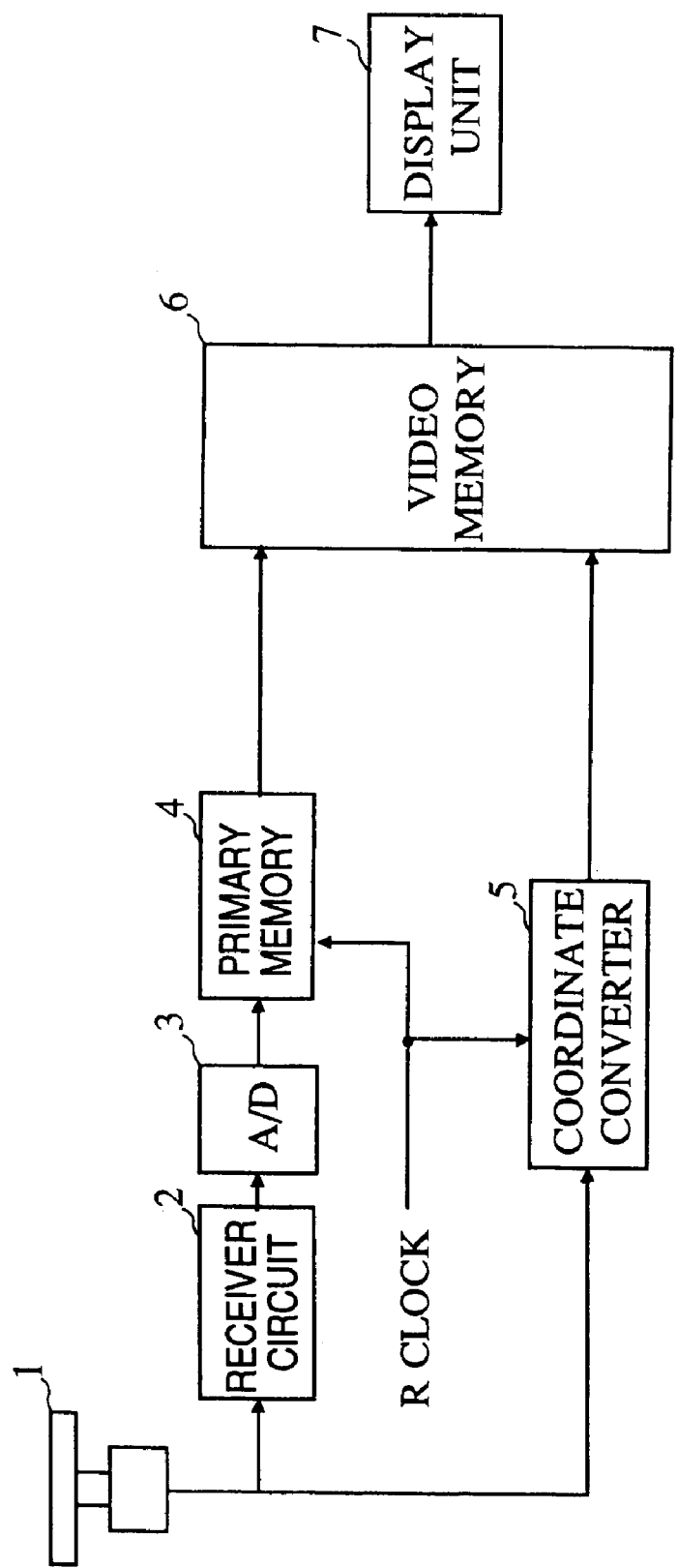
FIG. 1 is a block diagram of a conventional radar apparatus.
Figure 2:
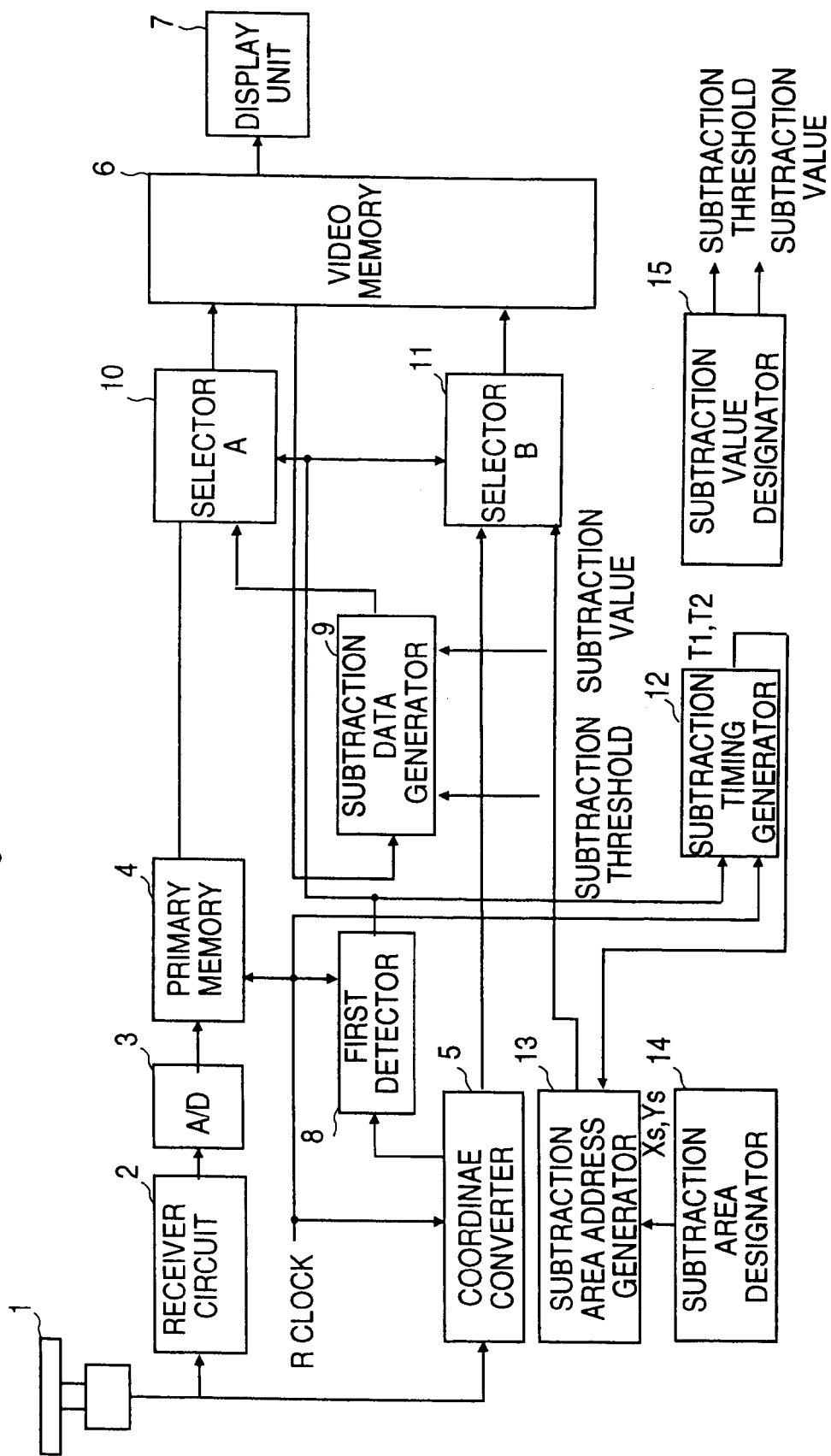
FIG. 2 is a block diagram of an embodiment of a radar apparatus according to the present invention.

FIG. 2 is a block diagram of a radar apparatus which is an embodiment of the present invention. This radar apparatus comprises, in addition to the construction of the conventional radar device shown in FIG. 1, a FIRST detector 8, a subtraction data generator 9, a selector 10 (selector A), a selector 11 (selector B), a subtraction timing generator 12, a subtraction area address generator 13, a subtraction area designator 14 and a subtraction value designator 15.

The FIRST detector 8 is constructed as described, for example, in Japanese Patent Publication TOKUKOHEI 3-11669 in detail. In a normal access, addresses for the video element for the video memory 6 are generated by the coordinate converter 5 based on a sweep direction θ and a distance r from the center in the polar coordinate system. The FIRST detector 8 outputs a FIRST signal when it is detected that an address for a pixel is generated for the first time within one rotation of a sweep line, i.e., that a pixel is accessed for the first time in the video memory 6. Whether a pixel within the video memory 6 has been accessed for the first time can readily be known by an output of the coordinate converter 5.

The subtraction data generator 9, subtracts a constant value to produce a resultant value from the accessed image data, when a pixel of a set area is accessed. The resultant value data is written again into the same pixel. Hereinafter, the access to an area will be referred to as a subtraction access. The area set on the video memory 6 will be referred to as a subtraction area, the constant value to be subtracted from the pixel data of the subtraction region will be referred to as a subtraction value, and a threshold value whether to perform a subtraction will be referred to as a subtraction threshold.

Figure 3:
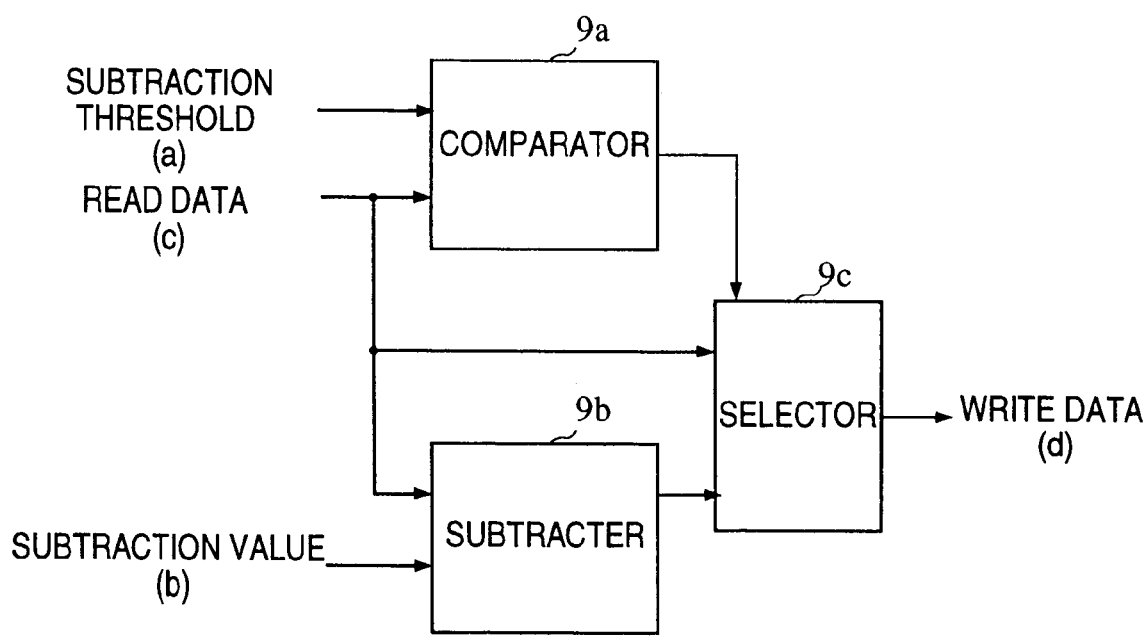
FIG. 3 is a block diagram of a subtraction data generator.

FIG. 3 is a block diagram of the subtraction data generator 9. This subtraction data generator 9 is comprised with a comparator 9a, a subtracter 9b, selector 9c. The comparator 9a makes a comparison to detect whether or not read data (c) read from one pixel within the subtraction area is lower than a subtraction threshold (a) separately set. The subtracter 9b subtracts a separately set subtraction value (b) from the read data (c). The comparison result in the comparator 9a is c<a in the comparator 9a, a subtraction operation as d=c−b is performed by the subtracter 9b, so that which write data (d)

is obtained. If a subtraction result d is a negative value, the subtraction result d will be made d=0. If the read data (c) is higher than the subtraction threshold (a), then the same data as the read data (c) is taken as the write data (d). Any arbitrary values can be assigned to the subtraction threshold (a) and the subtraction value (b) by a subtraction value designator 15.

The selector 10 is a section for selecting data to be written into the video memory 6. It outputs data read from the primary memory 4 only at a FIRST in the normal access, and outputs data generated by the subtraction data generator 9 in the subtraction access (at times other than FIRSTs).

The selector 11 is a section for selecting an address to be given to the video memory 6. It outputs an address generated by the coordinate converter 5 only at a FIRST in the normal access, and outputs an address generated by the subtraction area address generator 13 in the subtraction access (at times other than FIRSTs).

Figure 4:
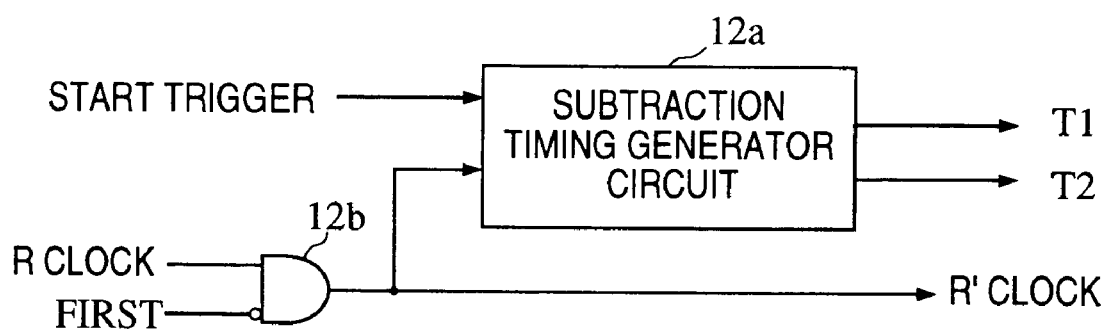
FIG. 4 is a block diagram of a subtraction timing generator.
Figure 5:
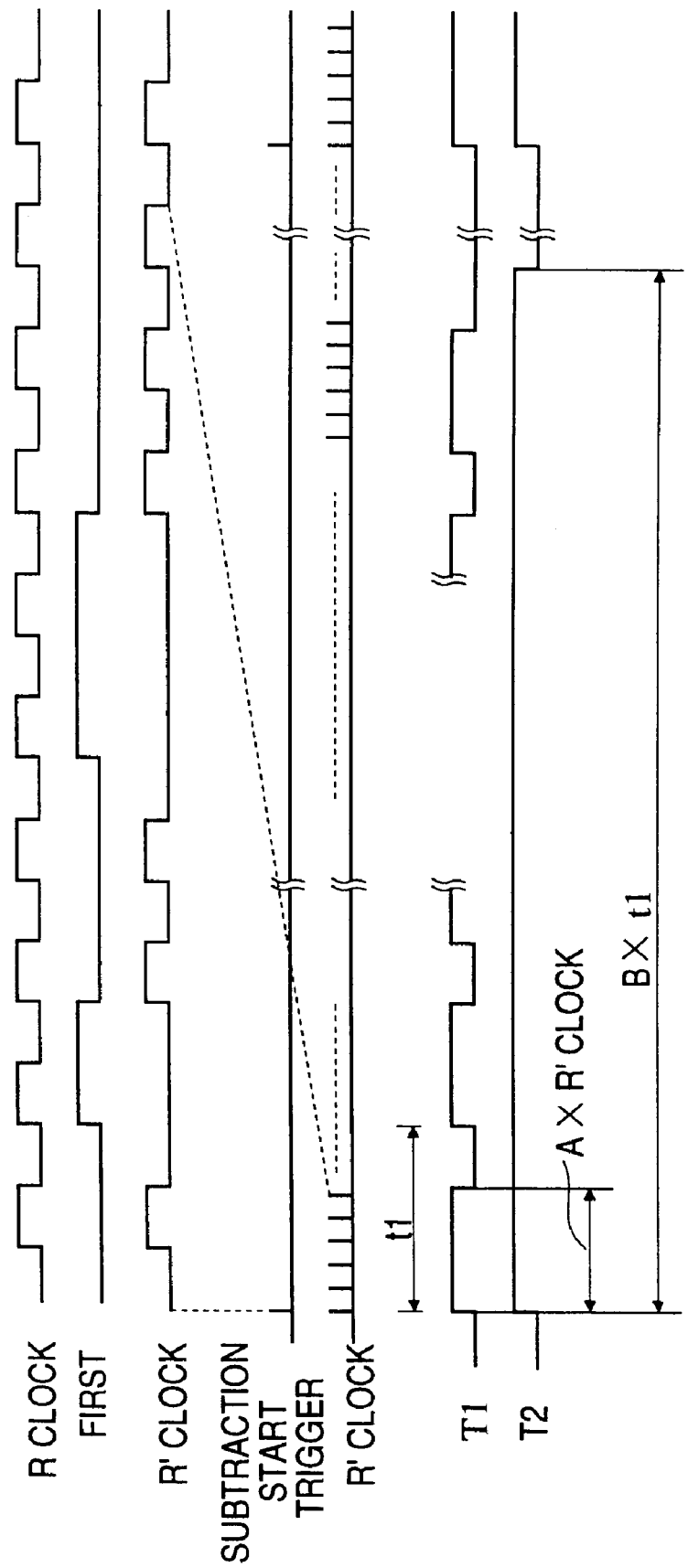
FIG. 5 is a timing chart for subtraction data generator.
Figure 6:
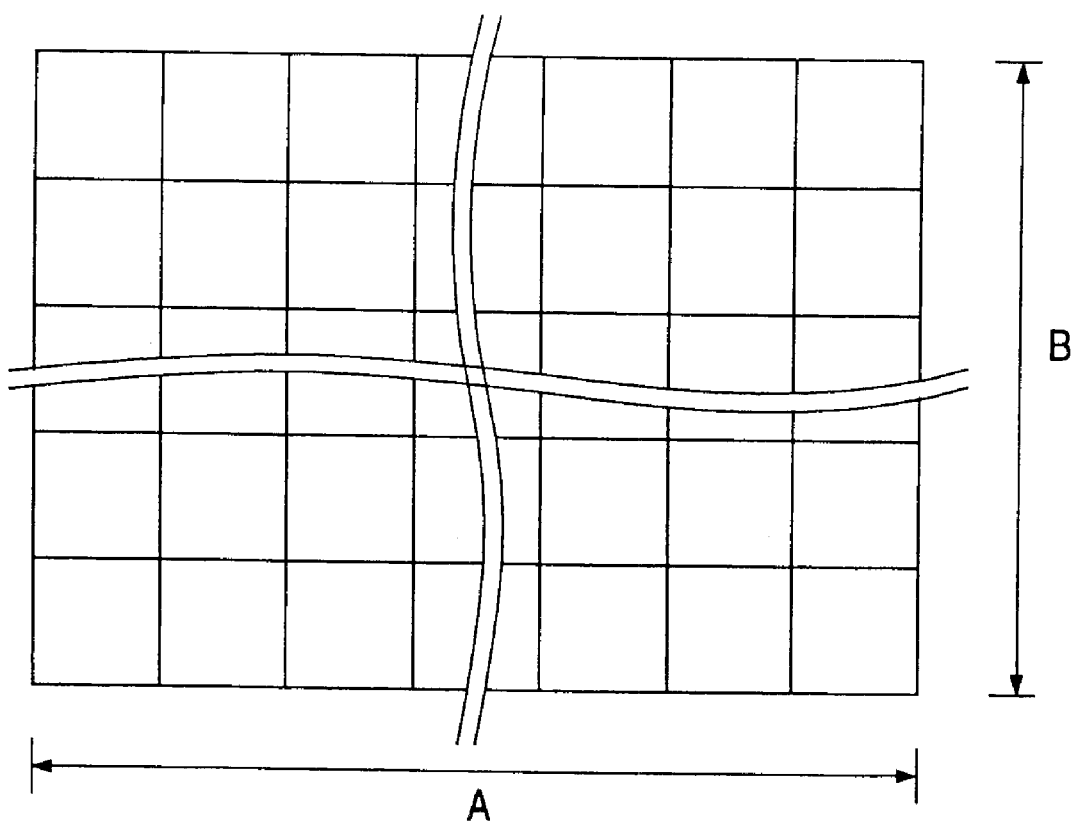
FIG. 6 shows a subtraction area.

The subtraction timing generator 12 operates when an R clock is high and the FIRST is low. The R clock is a read clock for the primary memory 4. That is, in order that the subtraction access is executed during periods other than FIRSTs, a clock for subtraction access is generated based on the R clock and the FIRST signal during periods when an R clock is high and the FIRST is low. The periods are represented by R'. FIG. 4 is a block diagram of the subtraction timing generator 12, FIG. 5 is a timing chart, and FIG. 6 shows a subtraction area. The subtraction timing generator 12 is comprised with a subtraction timing generator circuit 12a and a gate 12b. The period of the R clock from which the FIRST periods are excluded is judged at the gate 12b and generates the R' clock within this period, and the subtraction timing generator circuit 12a generates T1 and T2 in response to a subtraction start trigger.

Assuming that the subtraction area is a rectangular area which is sized A pixels in the X-direction and B pixels in the Y-direction in the subtraction area as shown in FIG. 6, then T1 equals a period of A times of the period R' clocks and T2 equals a period of B times of T1. That is, T1 is a subtraction period equal to one line of the subtraction area in the X-direction and T2 is a subtraction period corresponding to the entire subtraction area. After an end of T2, a subtraction start trigger is generated again, and the timing generating operation shown in FIG. 5 is repeated. It is to be noted from FIG. 5, since the R' clock is not at equal intervals, T1 is, strictly, also inconstant, and T2 is also inconstant.

Figure 7:
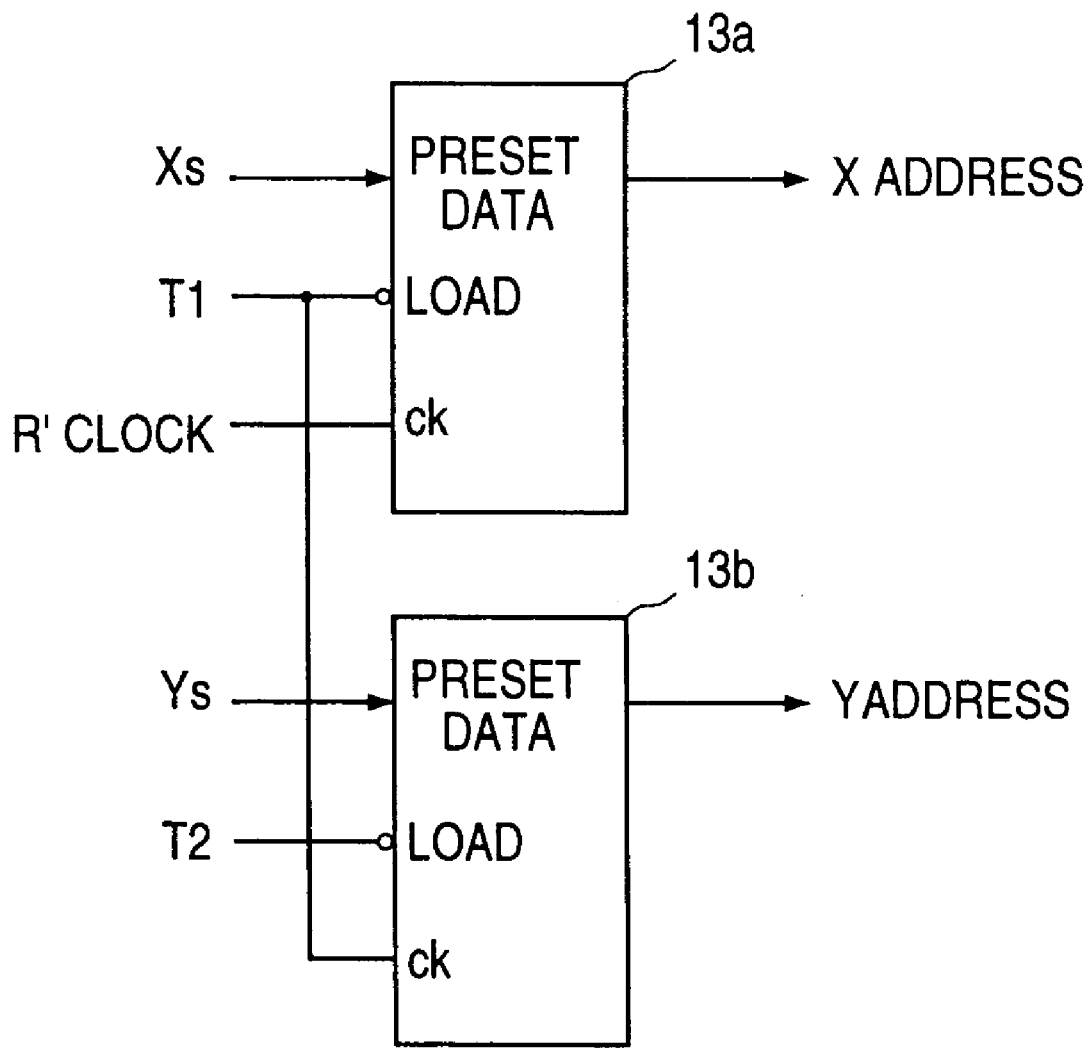
FIG. 7 is a block diagram of a subtraction region address generator.

The subtraction area address generator 13 generates an address for the subtraction access when a subtraction access is made. As shown in FIG. 7, this subtraction area address generator 13 is comprised with counters 13a and 13b. The counter 13a advances the X addres in the X-direction, starting from a subtraction start address Xs supplied from the subtraction area designator 14 each time R' clock is inputted. While, the counter 13b advances the Y address at T1 periods in the X-direction, starting from a subtraction start address Ys inputted from the subtraction area designator 14. If Xn and Yn are coordinates of an access point positioned at the nth point in the X-direction from the subtraction start address Xs and the mth point in the Y-direction from the subtraction start address Ys respectively $$Xn=Xs+n$$

$$Ym=Ys+m,$$

where Xs and Ys are the subtraction start addresses.

Figure 8:
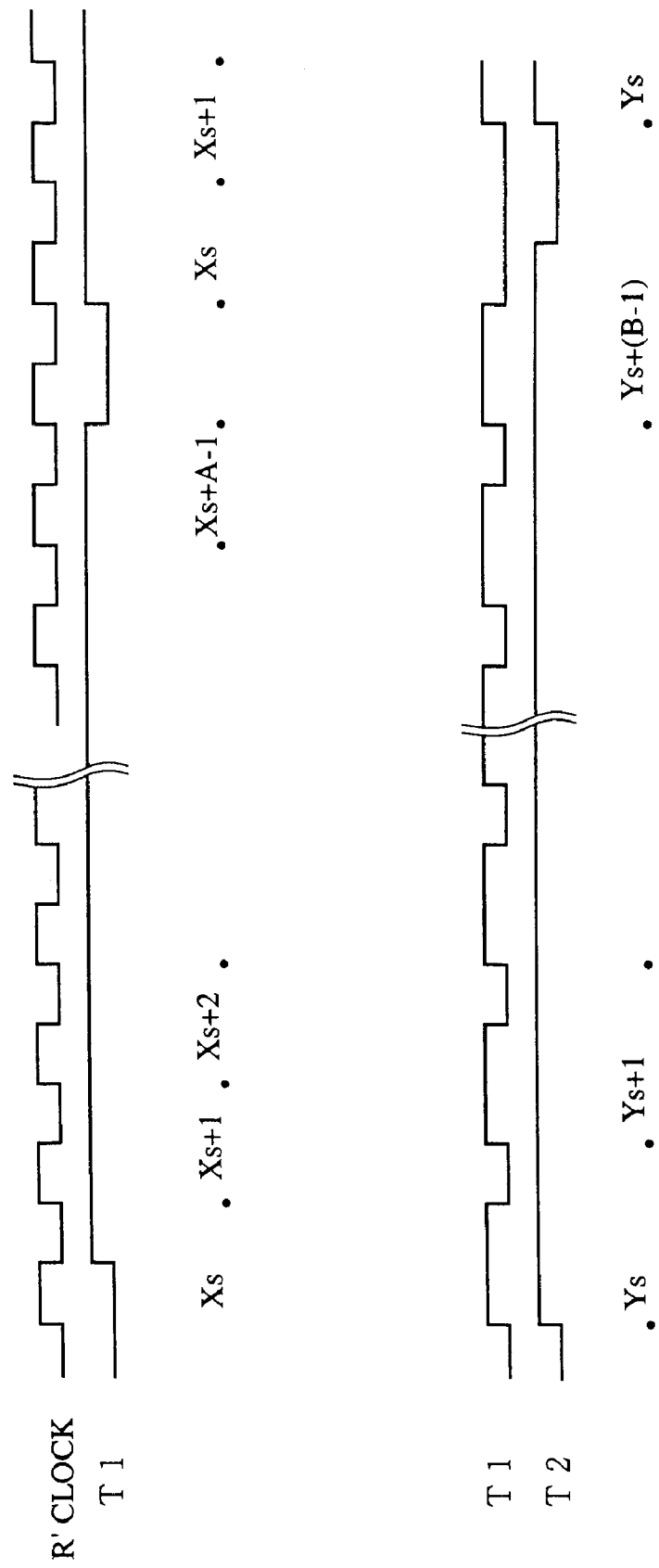
FIG. 8 is a timing chart for subtraction region address generator.
Figure 9:
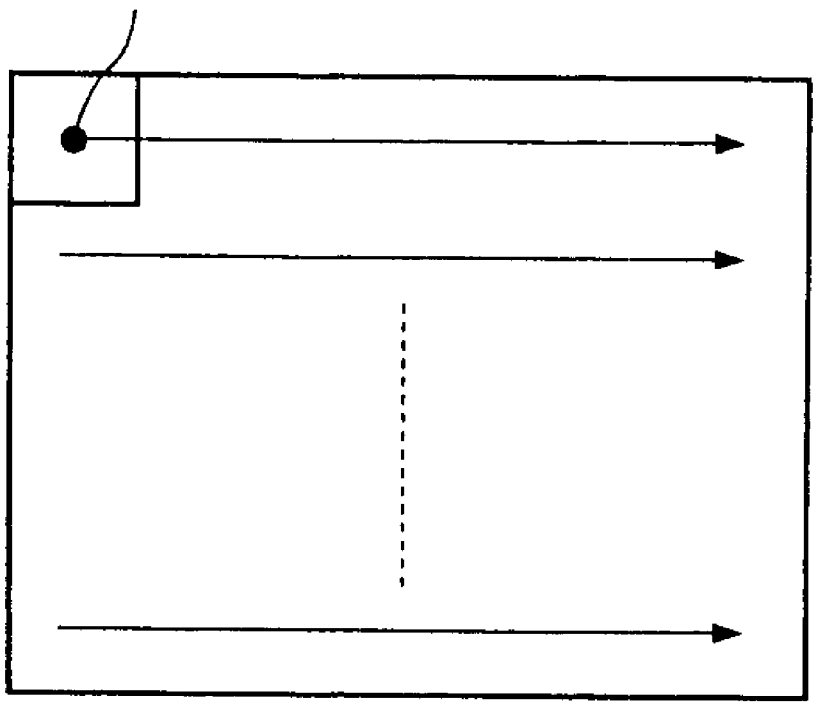
FIG. 9 shows how addresses are advanced.

FIG. 8 shows a timing chart for X address generation and a timing chart for Y address generation. FIG. 9 shows how a pair of the addresses is advanced in the subtraction area.

The subtraction area designator 14 is accomplished with, for example, a track ball, a cursor or the like an input section including as an input device provided at the operation section of the radar apparatus main unit. It is capable of specifying any arbitrary area on the display screen as the subtraction area. The subtraction value designator 15 is accomplished with for example, equations as an input device is capable of setting arbitrary values as the subtraction threshold and the subtraction value to be given to the subtraction data generator 9.

Next, operation of this radar apparatus will be explained.

With the radar apparatus of this embodiment, data is written into the video memory 6 by a normal access at a FIRST, and by a subtraction access at times other than FIRSTs. The normal access refers to an access for reading received data stored at a corresponding memory element of the video memory, and the subtraction access refers to an access for writing an output of the subtraction data generator 9. Now assuming that a FIRST has been detected in one coordinate conversion cycle of received data, the then corresponding data of the primary memory 4 is stored at a memory element of the video memory. If the FIRST is not detected in the succeeding coordinate conversion cycle, a subtraction access is effectuated, where data outputted by the subtraction data generator 9 is written to the pixel of the video memory the pair of the addresses of which is generated by the subtraction area address generator 13. The data generated by the subtraction data generator 9 at this time is a value resulting from subtracting a preset subtraction value from read data from the pixel of the relevant address. Therefore, on the display screen of the display unit 7, immediately after the subtraction data is written into the video memory, the brightness of the image at the position lowers (when the size of image data is represented by brightness). Thus, the update of data of the video memory 6 is done by normal access and subtraction access successively. With a normal access, update is performed by the received data obtained with a sweep rotation. While, with the subtraction update of data is made within a subtraction area set by the subtraction area designator 14. As a result of this, it becomes possible to make a display in which images in the subtraction area will be lowered gradually during a period since a pixel on the sweep line is updated by the normal access until the same pixel is updated with one more rotation of sweep, as if it was an operation that the gain is continuously lowered for each pixel.

Figure 11A:
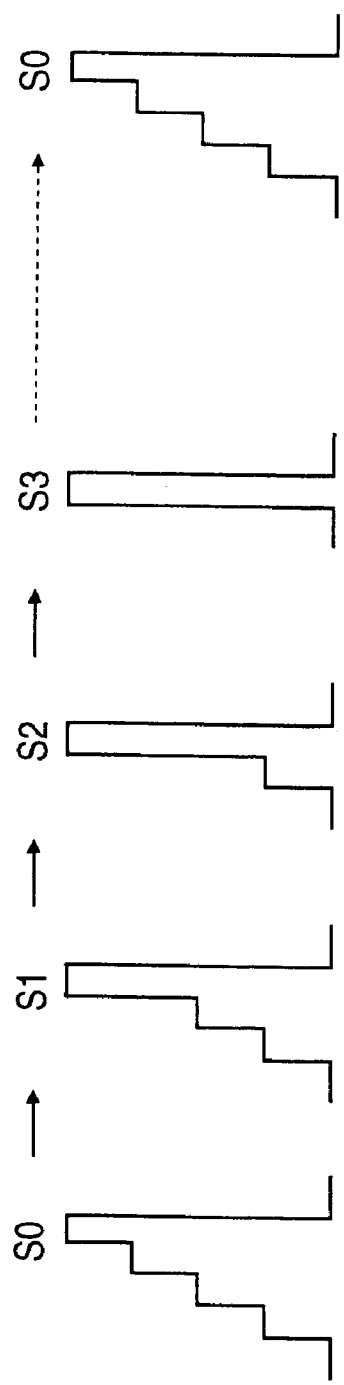
FIGS. 11A and 11B show data transition when a subtraction process is executed.
Figure 11B:
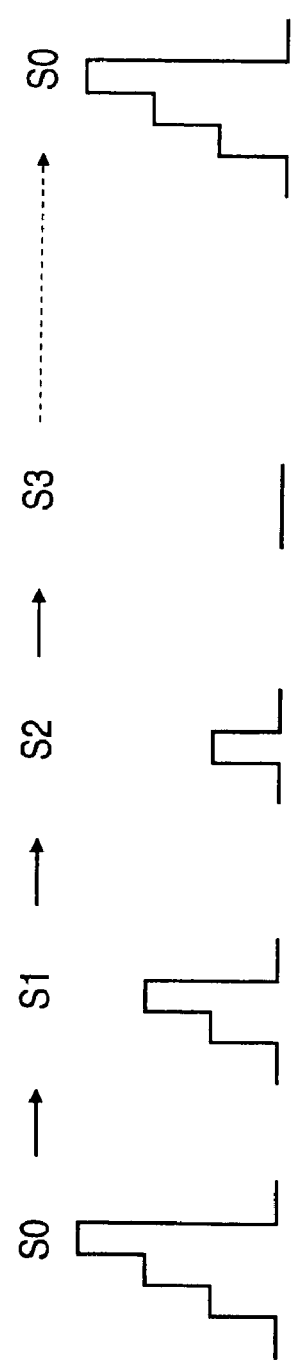

FIGS. 10 and 11 are drawings for explaining the operation. FIG. 10 shows a relationship between a received signal and image data when the gain is continuously lowered for one pixel as an example. FIG. 11 shows image data which vary with the subtraction operation. FIG. 11A shows a case where the subtraction process is performed with the gain level G5 selected in FIG. 10. FIG. 11B shows a case where the subtraction process is performed with the gain level G4 selected in FIG. 10. With this example, the subtraction threshold is set to L4 so that a subtraction is effectuated when the quantization level is less than L4 with the subtraction value being set to 1. Reference character S0 denotes an image data after the normal access is made, S1, S2 and S3 denote image data after the subtraction accesses are performed respectively, where the suffixes indicate respective stages of the subtraction access.

Referring to FIG. 11A, since the highest level of image data is higher than the subtraction threshold L4, the subtraction process is applied only to signals lower than the level of image data. Thus, an image of intense level can be displayed clearly, and images of relatively weak levels such as clutter in the surrounding can be gradually erased. While, when the gain level is set to G4 as shown in FIG. 11B, the level of all the signals will be lower than the subtraction threshold L4, so that the entire image within the subtraction region can be gradually erased. Even during such changes of the image, it becomes possible to discriminate the image of the target out of the clutter. There depends on the circumstances a proper setting of the gain for making the image of the target discriminable out of the clutter. There are some cases in which the adjustment shown in FIG. 11A is desirable. There are other cases in which the adjustment shown in FIG. 11B is desirable.

Referring to FIG. 2, the selector 10 and the selector 11 select an output from the primary memory 4 and an output from the coordinate converter 5, in respect to a first signal received at a First. At times other than FIRST, the selector 10 and the selector 11 select an output from the subtraction data generator 9 and an output from the subtraction area address generator 13, respectively. The subtraction timing generator 12 generates T1 and T2 signals according to the R' clock during periods other than that of FIRST detection, and outputs the signals to the subtraction area address generator 13. Also, the designation of the subtraction start addresses Xs and Ys by the subtraction area designator 14 can be made at any arbitrary time, and the setting of the subtraction threshold and the subtraction value provided by the subtraction value designator 15 can be made at any arbitrary time as well.

Figure 12:
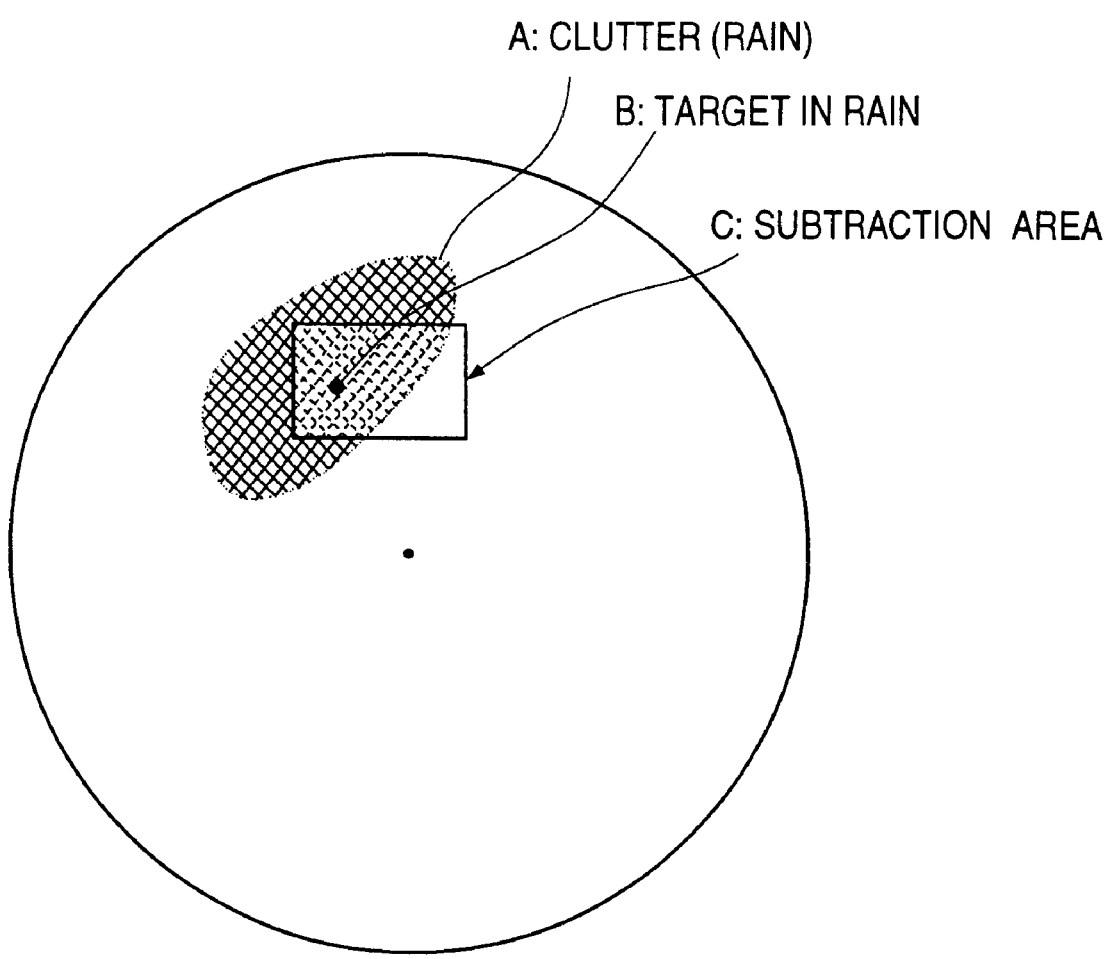
FIG. 12 shows a display example.

Through the operations as described above, for example, a display as shown in FIG. 12 can be obtained. In the display area of the figure, a reference character A denotes a clutter area due to rain, B denotes a target in the rain and C denotes a subtraction area. In this embodiment, the brightness of the target B is set to an appropriate one as shown in FIG. 11A. That is, while the whole screen is updated once, the image of the area gradually lowers in brightness except the target B within the subtraction area C. Also, since this subtraction area C can be moved to any arbitrary position by the subtraction area designator 14, it is possible to move this subtraction area C during the update of image data by the normal access and to obtain similar images which are lowered gradually in brightness at a new position.

The size of the subtraction area C, i.e., the period T2 corresponding to the whole of the subtraction area C accessed, is related to a period T of one rotation of a sweep line. As the sweep rotation cycle T goes higher, the subtraction period during one sweep rotation becomes shorter correspondingly, so that the number of the cycle T2 also becomes smaller. The size of the subtraction area C is, ideally, set so as to satisfy the following equation, assuming that a sweep rotation cycle is T, the number of subtractions is N required until the values of all the pixel data in the subtraction area C become 0s (i.e., the write data (d) of FIG. 3 becomes a 0) and a time is t required for one access to the entire subtraction area C:

$$T = N \cdot t.$$

This is because there needs enough time to observe the subtraction process in progress on the display unit. However, the case, in which the above-mentioned equation is not satisfied, does not always mean that no effects are obtained, and practically, the subtraction area may appropriately be set to a size as close to a size determined by the equation as possible. The higher the sweep rotation speed or the rotation speed of the antenna goes, the smaller the size of the subtraction area C will be in terms of observation easiness. However, when there occurs a limitation on the size of the subtraction area, there can be obtained effects by moving this area within the display screen, with the effects being similar to those obtained when the subtraction area is increased in size. In this embodiment, a normal access is performed at a FIRST and a subtraction access is performed at times other than FIRSTs. However, it is also possible that a last access to a pixel of the video memory is detected as a LAST and that a normal access is performed at this LAST and a subtraction access is performed at times other than LASTs.

Figure 13:
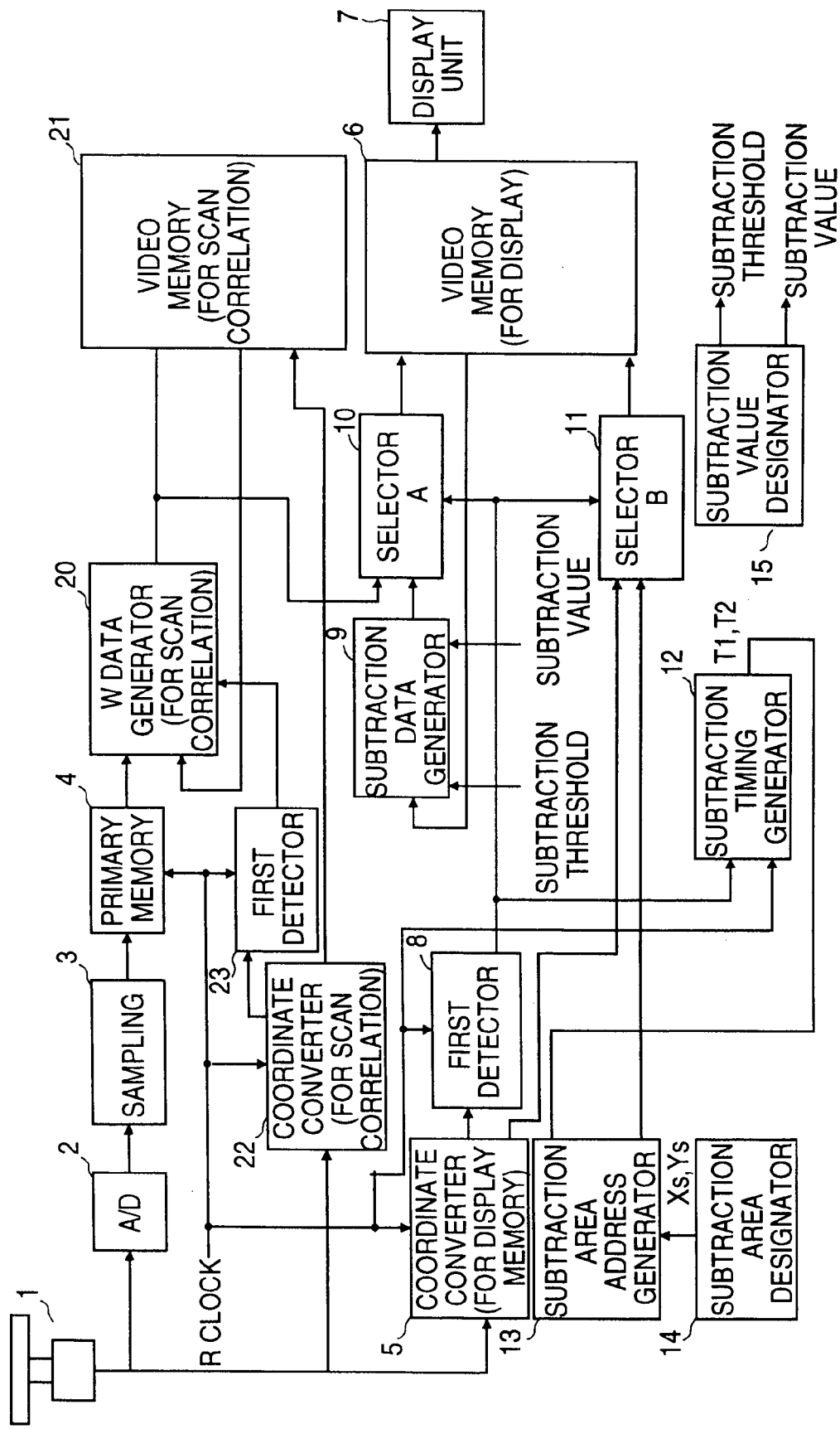
FIG. 13 is a block diagram of another embodiment according to the present invention.

FIG. 13 shows another embodiment of the present invention. This embodiment differs from that of FIG. 2 in that a W data generator 20 (for scan correlation), a video memory (for scan correlation), a coordinate converter 22 (for scan correlation) and a FIRST detector 23 (for scan correlation) are additionally provided.

A scan correlation process refers to a correlation process performed for each one of successive sweep rotations. That is, the scan correlation process is a process for performing a correlation process between data obtained during each one of contiguous sweep rotations (between data in the memory and new data), i.e., a process in which data to be written into the memory this time is determined in the normal access by, for example, an averaging process or the like using data in the video memory obtained during a previous one rotation of the antenna and data newly obtained during the current rotation. This process has conventionally been practiced. Whereas this scan correlation process is a process for rewriting identical pixels only once during each one sweep rotation, the subtraction process is a process for subtracting pixel data at all times. Therefore, when an identical video memory is used, it is impossible to perform a subtraction process and a scan correlation process at the same time. It will be possible to execute the scan correlation process and the subtraction process at the same time by providing a memory for the scan correlation process independently of the display video memory, by executing a scan correlation process at the preceding stage, and by using a result of the scan correlation process as write data for normal access to the display video memory. FIG. 13 shows a block diagram of an apparatus therefor.

Referring to FIG. 13, the W data generator 20 is a selector provided for the scan correlation process. When a FIRST is detected by the FIRST detector 23, the W data generator 20 performs a correlation process on new data derived from the primary memory 4 and data of a video memory 21 provided for scan correlation and then stores the processed data again into the same memory element in the video memory 21. The data is also stored into the display video memory 6 through the selector 10. At times other the FIRSTs, the W data generator 20 outputs data read from the video memory 21 without the scan correlation. Thus, the scan-correlation processed data is stored into the video memory 21. The coordinate converter 22 for scan correlation process generates coordinate conversion addresses for the video memory 21. The coordinate converter 22 is provided independently of the coordinate converter 5 for the display memory, since the video memory 21 for scan correlation stores data in the true-motion coordinate mode, while the video memory 6 for display stores data in a mode selected from among such relative-motion modes as head-up, course-up and north-up modes and the true-motion coordinate mode. It is to be noted that compass and ship speed information is inputted to the individual coordinate converters 5 and 22, which is not shown.

With the construction explained in the foregoing, data for the scan correlation process can be used as write data for normal access to the display video memory 6.

Also, when a plurality of data pieces are supplied to one pixel during one sweep rotation, a MAX process is performed in which a data having maximum value out of these data pieces is selected and rewritten at the preceding stage. And the resultant data is used for write data for normal access to the display video memory 6, so that a MAX process and a subtraction process can be done.

As explained above in detail, according to the present invention, there can be produced effects obtained by adjusting the gain within the area at all times during an observation, with the effects being similar by subtracting a constant value from pixel data of a set area. Thus, it becomes possible to display a target as distinguished from clutter even without performing any manual fine adjustments.

Also, there can be displayed images being gradually diminished with the set area while echo signals obtained during a sweep rotation (an antenna rotation) are simultaneously displayed, since a subtraction process for pixel data in the area is performed by the subtraction means during a period in which a coordinate-conversion access to the video memory is not made.

The subtraction process can be also performed when LAST detection means is provided, and further the area can be arbitrarily established by the area designation means. Therefore, it will be possible, for example, to designate an area of interest on the screen by means of a cursor or the like and display a target as distinguished in this area from clutter. When the sweep rotation speed is set high, the size of the set subtraction area should be made smaller, and the small set area is freely moved on the screen to obtain the same effects as with the foregoing embodiments.

Industrial Applicability

The present invention can be used for radar apparatuses to be installed in ships such as merchant vessels and fishing vessels, sonar apparatuses for detecting fish schools or the sea bottom, and the like.

What is claimed is:

1. A radar and like apparatus, comprising:
   a video memory for successively performing coordinate conversions on received data from a polar coordinate system to a rectangular Cartesian coordinate system along with sweep rotation and storing the converted data;
   a subtractor for subtracting a constant value from pixel data of an area set on the video memory in parallel with data write accompanied by the coordinate conversion; and
   a FIRST detector for detecting, as a FIRST access, when a pixel of the video memory is accessed for a first time in performing the coordinate conversion during one sweep rotation, wherein the subtractor performs a subtraction at a time other than the FIRST detection.

2. The radar and like apparatus as claimed in claim 1, comprising:
   another video memory provided independently of the video memory; and
   a correlation-process selector for, when a FIRST is detected by the FIRST detector, subjecting pixel data of said another video memory and received data present at that time to a specified correlation process, storing the data again into said another video memory, and moreover storing the correlation-processed data into the video memory, and for, at a time other than the FIRST detection, storing the pixel data of said another video memory again into said another video memory.

3. A radar and like apparatus, comprising:
   a video memory for successively performing coordinate conversions on received data from a polar coordinate system to a rectangular Cartesian coordinate system along with sweep rotation and storing the converted data;
   a subtractor for subtracting a constant value from pixel data of an area set on the video memory in parallel with data write accompanied by the coordinate conversion; and
   a LAST detector for detecting, as a LAST access, when a pixel of the video memory is accessed for the last time in performing the coordinate conversion during one sweep rotation, wherein the subtractor performs a subtraction at a time other than the LAST detection.

4. The radar and like apparatus as claimed in any one of claim 1 or 3, further comprising an area designator for designating the area.

5. The radar and like apparatus as claimed in any one of claim 1 or 3, further comprising a selector for selecting the constant value from a plurality of values.

6. The radar and like apparatus as claimed in any one of claim 1 or 3, wherein the subtractor has a comparator for comparing the image data with a specified threshold value, and subtract the constant value from pixel data having values less than the threshold value.

7. A method for writing received data into a memory comprising:
   a step for successively performing a coordinate conversion on received data from a polar coordinate system to a rectangular Cartesian coordinate system and storing the converted data into as video memory at each sweep rotation with the data being updated;
   a subtraction step for subtracting a constant value from pixel data of an area set on the video memory in parallel with data write accompanied by the coordinate conversion, wherein data in the area is successively subtracted during one sweep rotation; and
   a FIRST detection step for detecting, as a FIRST access, when a pixel of the video memory is accessed for a first time in performing the coordinate conversion during one sweep rotation,
   wherein in the subtraction step, a subtraction is performed at a time other than the FIRST detection.

8. A radar and like apparatus, comprising:
   a primary memory for temporarily storing received data;
   a video memory for successively storing the data stored in the primary memory;
   a display unit for displaying the data stored in the video memory;
   a coordinate converter circuit for performing a coordinate conversion to convert a polar coordinate position of received data into a rectangular Cartesian coordinate address of the video memory;
   a FIRST detector circuit for detecting, as a FIRST access, an access that a pixel of the video memory is accessed for a first time at the coordinate conversion during one sweep rotation, wherein the subtractor performs a subtraction at a time other than the FIRST detection;
   a subtraction area address generator circuit for setting an area on the video memory as a subtraction area and successively generating addresses of this area;
   a subtraction data generator circuit for generating, as subtraction data, data resulting from subtracting a constant value from pixel data in the subtraction area; and a selector for, at the FIRST detection, selecting a rectangular-coordinate address derived from the coordinate converter as an address for the video memory and further selecting data of the primary memory as write data to be written into the video memory, and for, at a time other than the FIRST detection, selecting an address derived from the subtraction area address generator as an address of the video memory and further selecting subtraction data generated by the subtraction data generator as write data to be written into the video memory.

9. The radar and like apparatus as claimed in claim 8, wherein the subtraction data generator circuit comprises a comparator for comparing the pixel data with a specified threshold value and a subtracter for subtracting the constant value from pixel data having values not more than the threshold value.

10. The radar and like apparatus as claimed in claim 8 or 9, further comprising:

another video memory provided independently of the video memory; and a correlation-process selector for, when the FIRST is detected by the FIRST detector circuit, subjecting pixel data of said another video memory and received data present at that time to a specified correlation process, storing the data again into said another video memory, and moreover storing the correlation-processed data into the video memory, and for, at a time other than the FIRST detection, storing the pixel data of said another video memory again into this same memory.

* * * * *